(12) United States Patent
Bianchi et al.

(10) Patent No.: US 10,960,303 B2
(45) Date of Patent: Mar. 30, 2021

(54) KINESTHETIC-FEEDBACK WEARABLE APPARATUS FOR VIRTUAL REALITY AND AUGMENTED REALITY AND METHOD FOR CONTROLLING THE SAME

(71) Applicant: KOREA ADVANCED INSTITUTE OF SCIENCE AND TECHNOLOGY (KAIST), Daejeon (KR)

(72) Inventors: Andrea Bianchi, Daejeon (KR); Duck-Joo Lee, Daejeon (KR); Young Min Jo, Daejeon (KR); Seungwoo Je, Daejeon (KR); Junkyu Kim, Daejeon (KR)

(73) Assignee: KOREA ADVANCED INSTITUTE OF SCIENCE AND TECHNOLOGY (KAIST), Daejeon (KR)

( * ) Notice: Subject to any disclaimer, the term of this patent is extended or adjusted under 35 U.S.C. 154(b) by 15 days.

(21) Appl. No.: 16/390,063

(22) Filed: Apr. 22, 2019

(65) Prior Publication Data

US 2019/0321724 A1     Oct. 24, 2019

(30) Foreign Application Priority Data

Apr. 20, 2018  (KR) .................. 10-2018-0046244

(51) Int. Cl.
 *A63F 13/285*  (2014.01)
 *G06F 3/01*    (2006.01)
 *A63F 13/212*  (2014.01)
(52) U.S. Cl.
 CPC .......... *A63F 13/285* (2014.09); *A63F 13/212* (2014.09); *G06F 3/011* (2013.01); *G06F 3/016* (2013.01); *A63F 2300/8082* (2013.01)

(58) Field of Classification Search
 CPC .................. A63F 13/285; A63F 13/212; A63F 2300/8082; G06F 3/011; G06F 3/016
 USPC ........................................................... 463/30
 See application file for complete search history.

(56) References Cited

U.S. PATENT DOCUMENTS

| 8,814,691 | B2 * | 8/2014 | Haddick ............ G02B 27/0172 463/42 |
| 2008/0153591 | A1 * | 6/2008 | Deligiannidis ......... G06F 3/011 463/31 |
| 2015/0348330 | A1 * | 12/2015 | Balachandreswaran ..................... A63F 13/285 463/5 |
| 2018/0067309 | A1 * | 3/2018 | Shimura ............... G06F 3/0304 |

* cited by examiner

*Primary Examiner* — Allen Chan
(74) *Attorney, Agent, or Firm* — Lex IP Meister, PLLC

(57) ABSTRACT

The present invention relates to a kinesthetic-feedback wearable apparatus which realizes a kinesthetic-feedback in a virtual reality (VR) or augmented reality (AR), and more particularly to a kinesthetic-feedback wearable apparatus which provides a resistance, which is suitable for a situation in a virtual reality or augmented reality, to a user by using a propeller in a state in which a virtual reality or augmented reality device is mounted to the user who uses the virtual reality or augmented reality device. According to the present invention, a reactive force for a kinesthetic-feedback can be easily realized through a scheme of attaching a light propeller to a wrist, and reactive forces of various directions may be realized only with a small number of propellers by allowing the directions and the RPMs of the propellers to be separately controlled for a higher degree of freedom when two or more propellers are provided.

16 Claims, 19 Drawing Sheets

[Fig. 1]
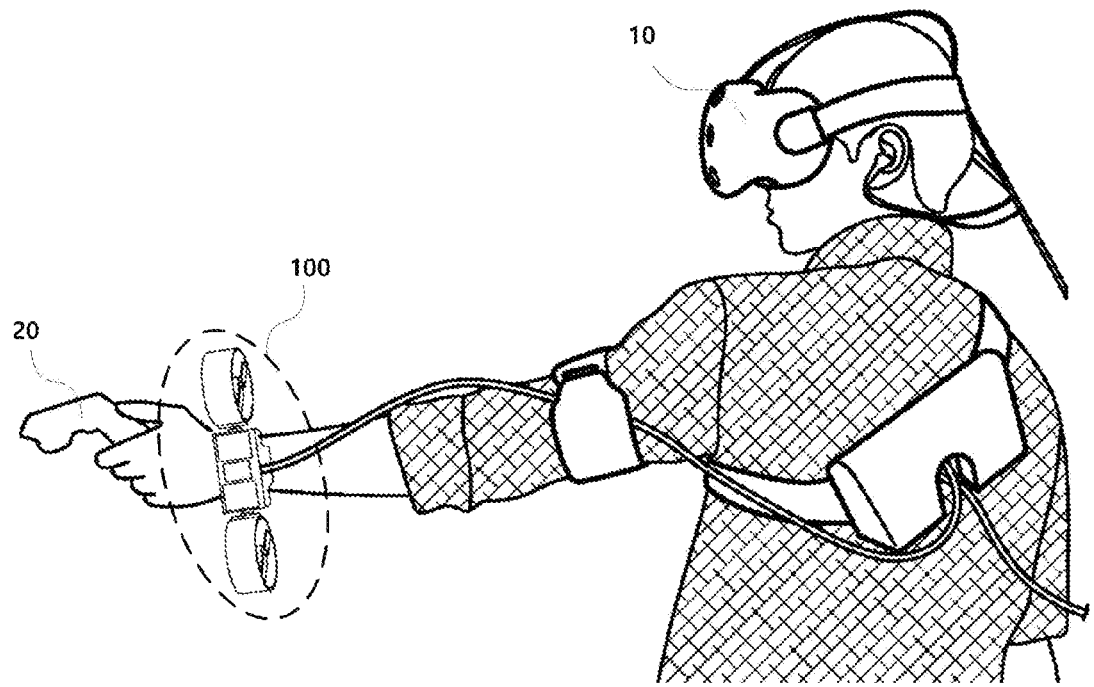

[Fig. 2]
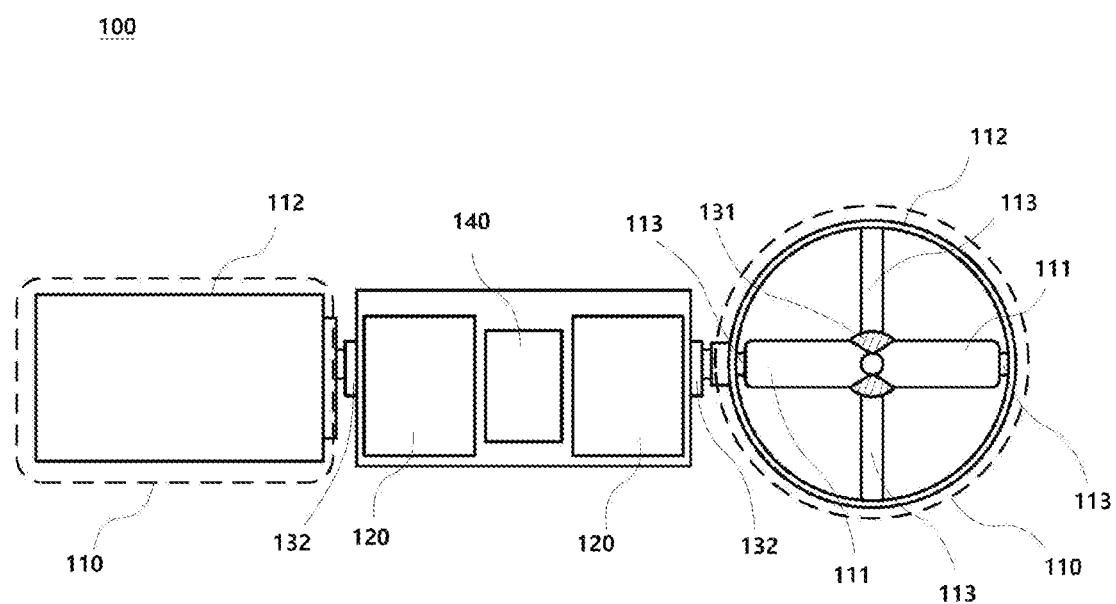

[Fig. 3]
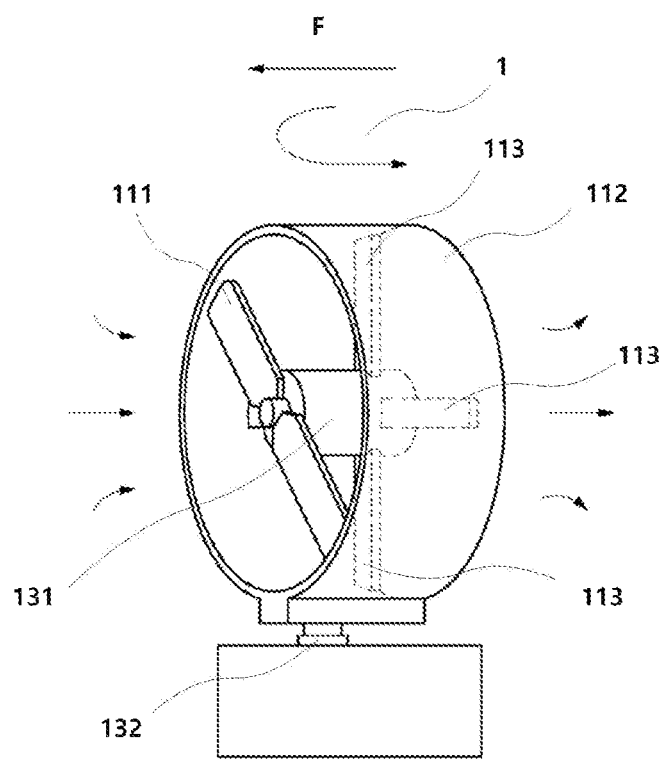

[Fig. 4]
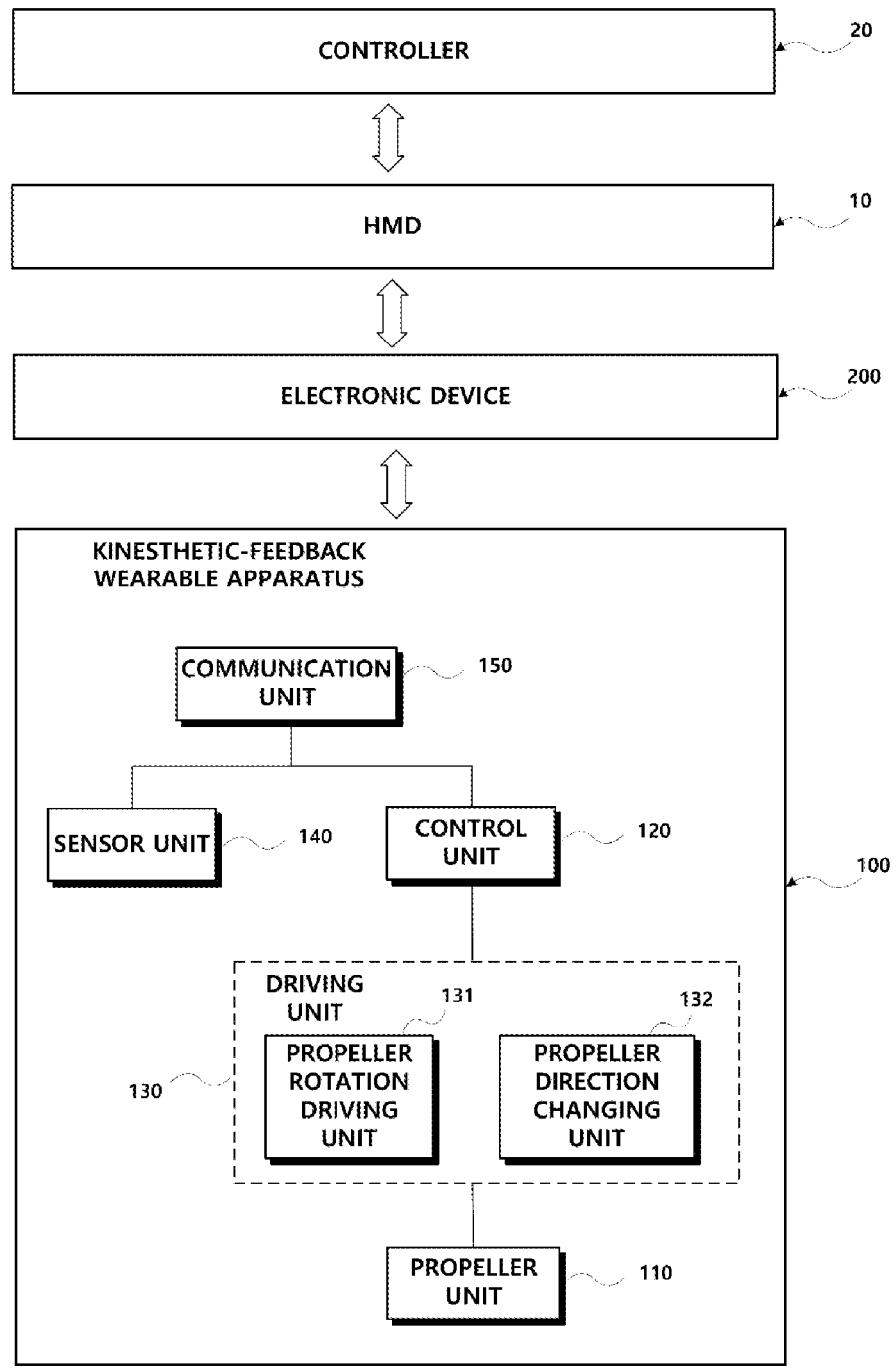

[Fig. 5]
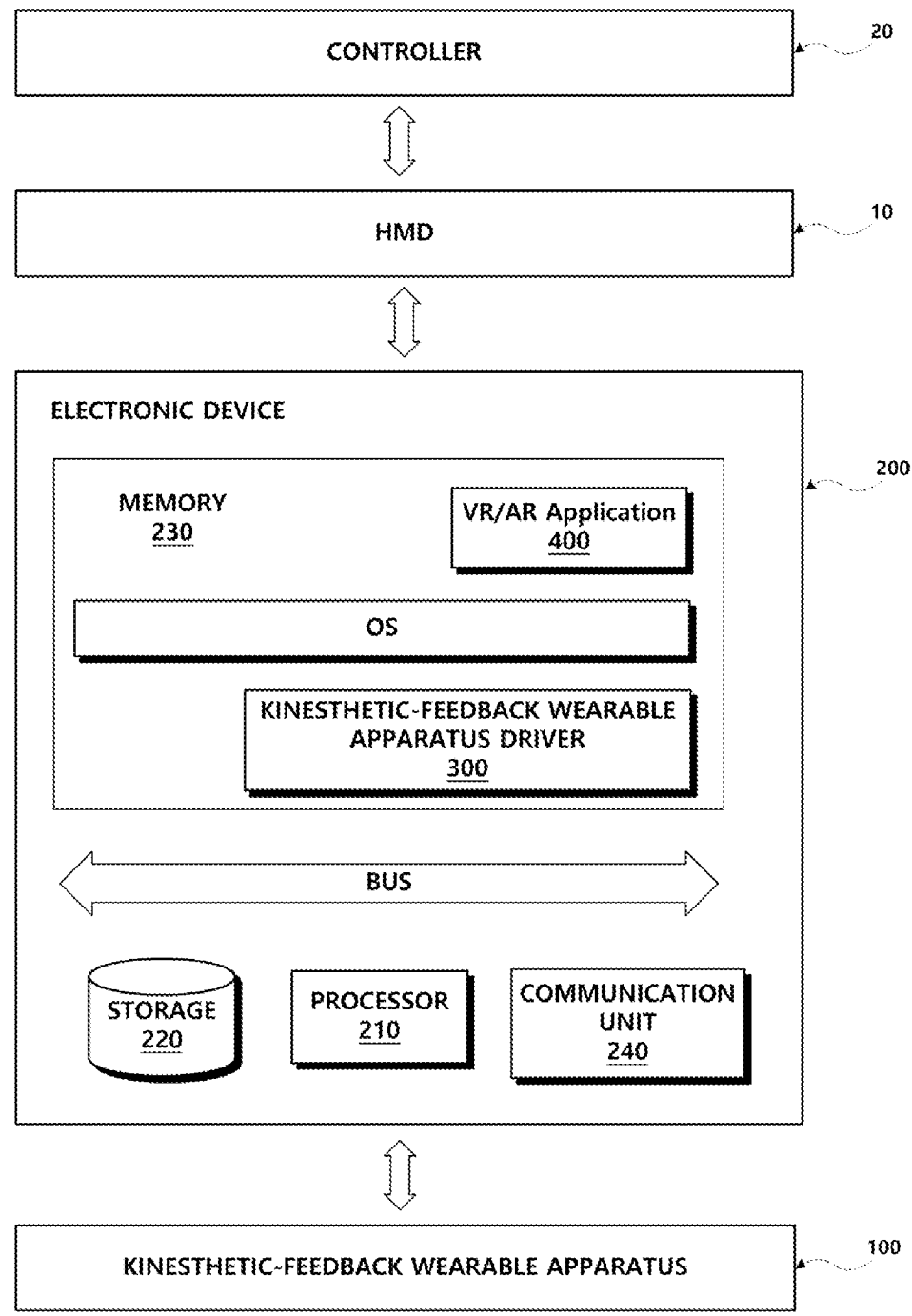

[Fig. 6]
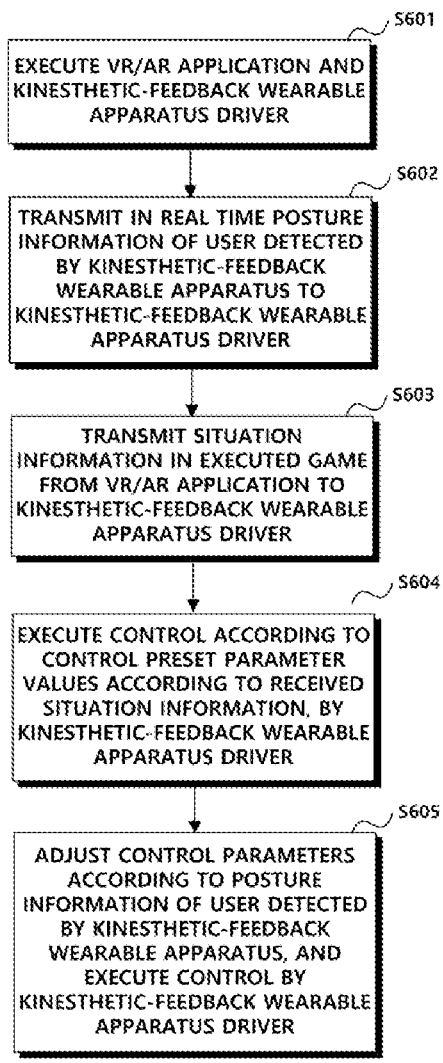

[Fig. 7A]
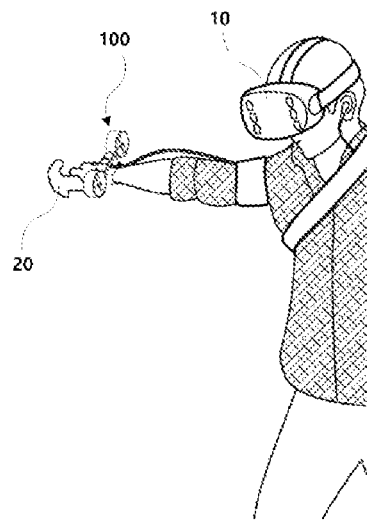
[Fig. 7B]

[Fig. 8A]
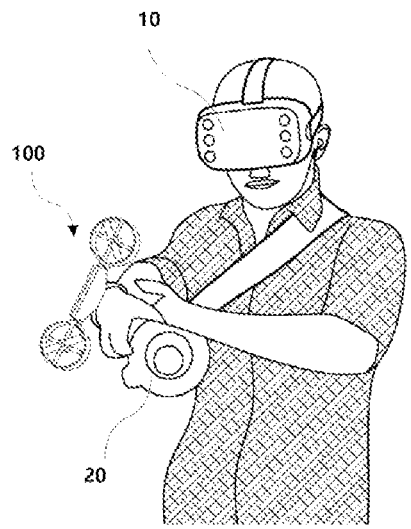
[Fig. 8B]
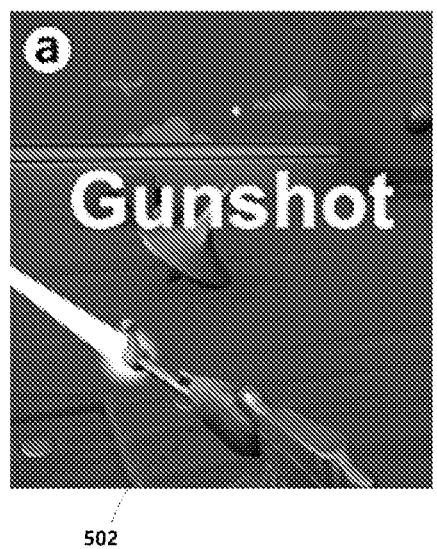

[Fig. 9A]
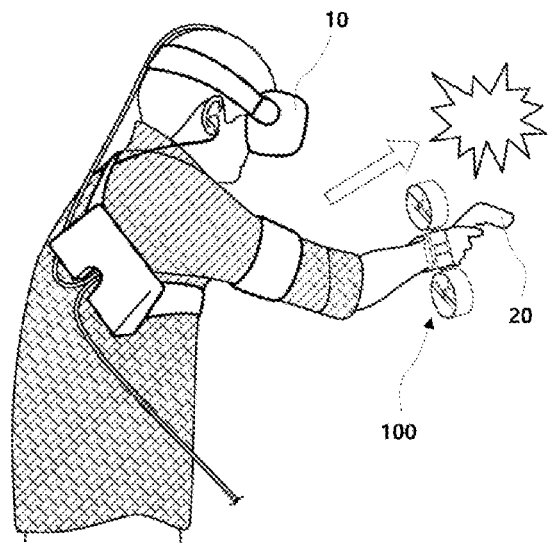
[Fig. 9B]
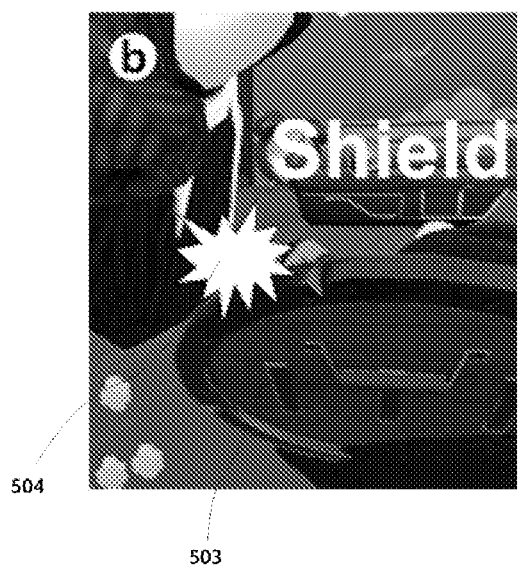

[Fig. 10]
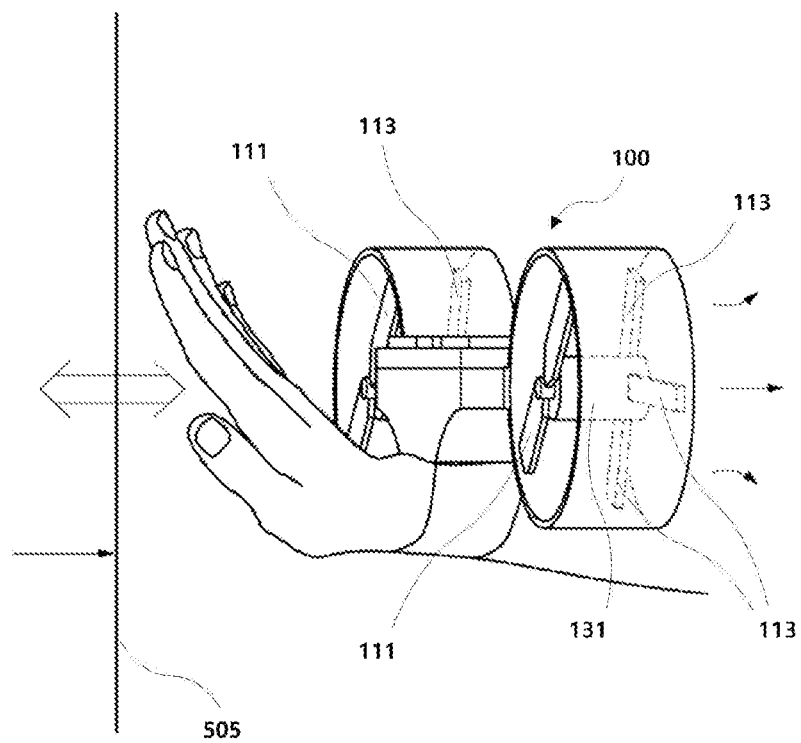

[Fig. 11]
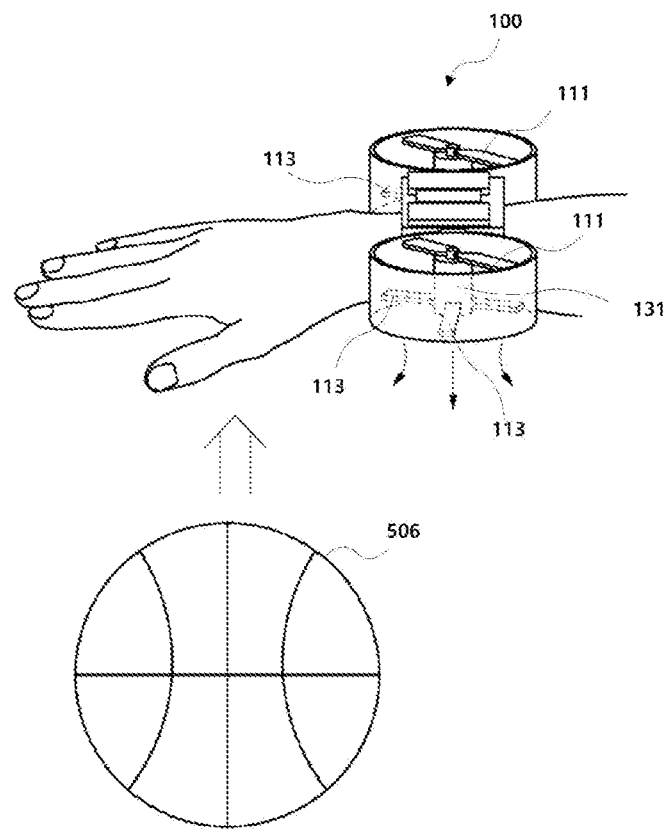

[Fig. 12]
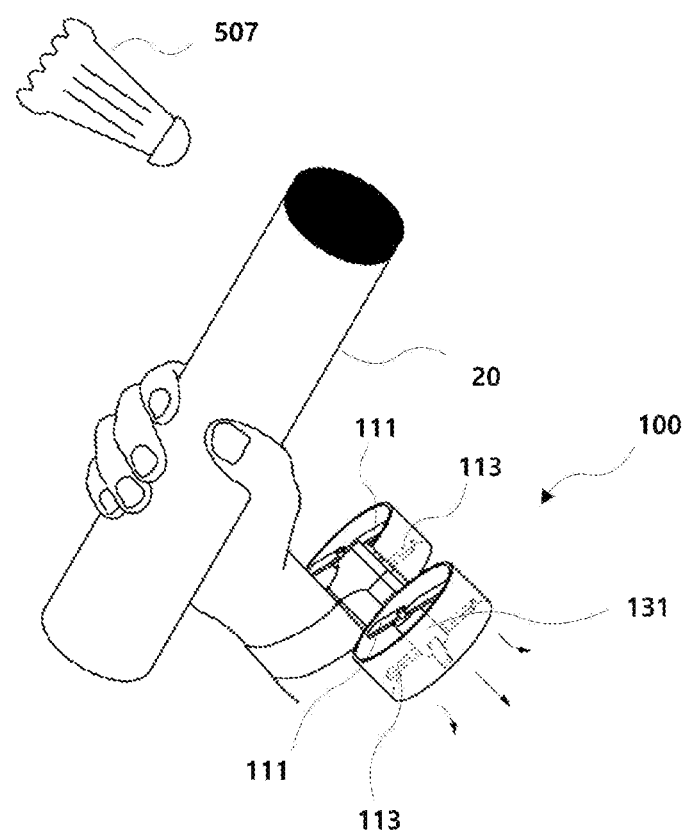

[Fig. 13A]
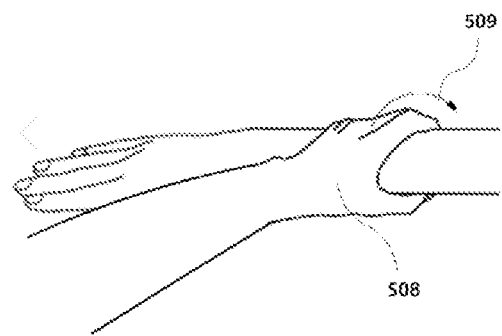
[Fig. 13B]
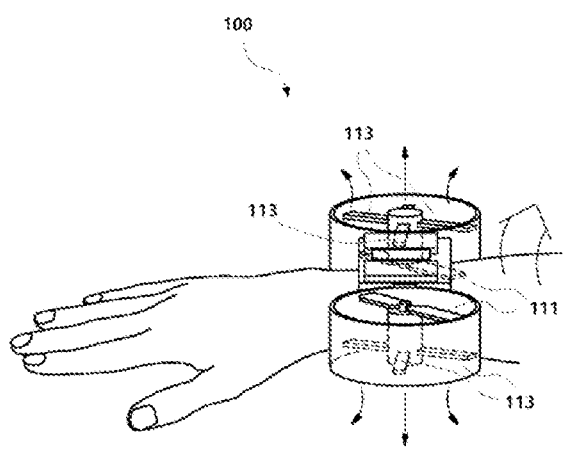

[Fig. 14]
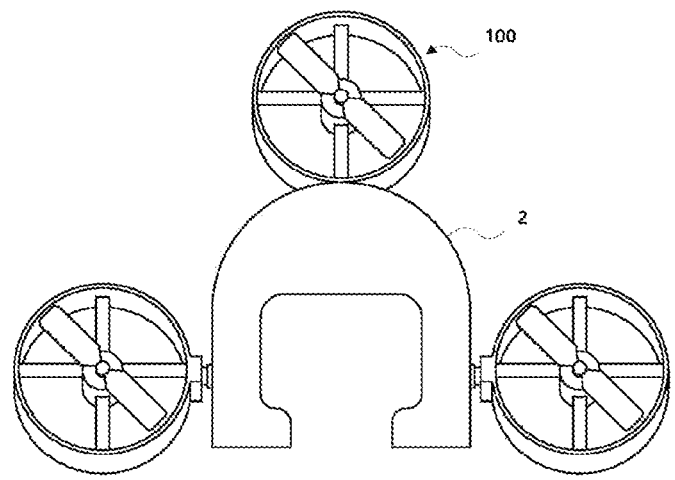

[Fig. 15]
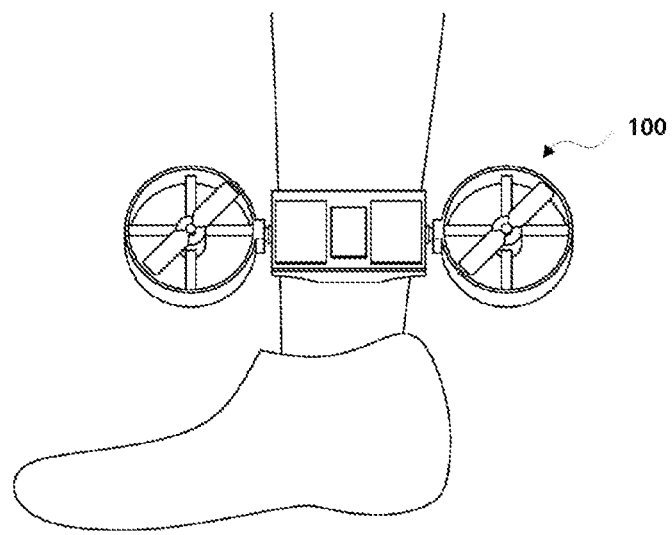

[Fig. 16]
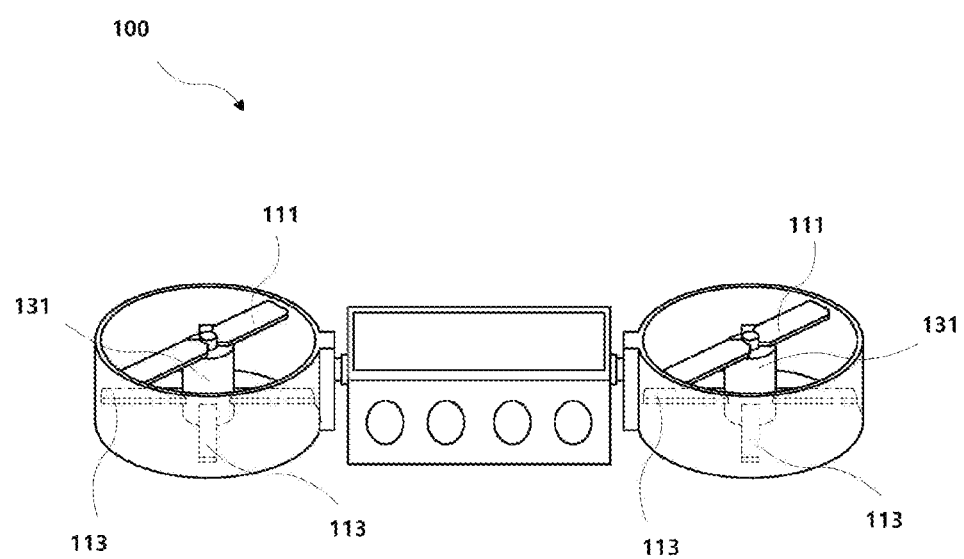

[Fig. 17]
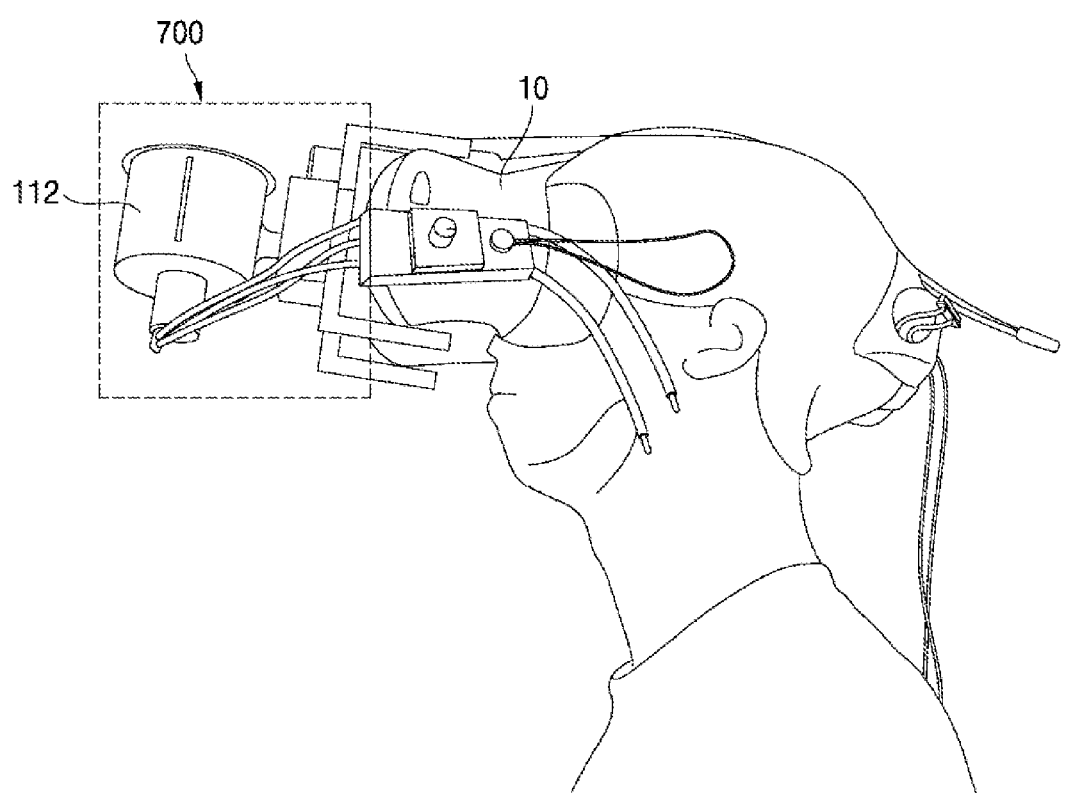

[Fig. 18]
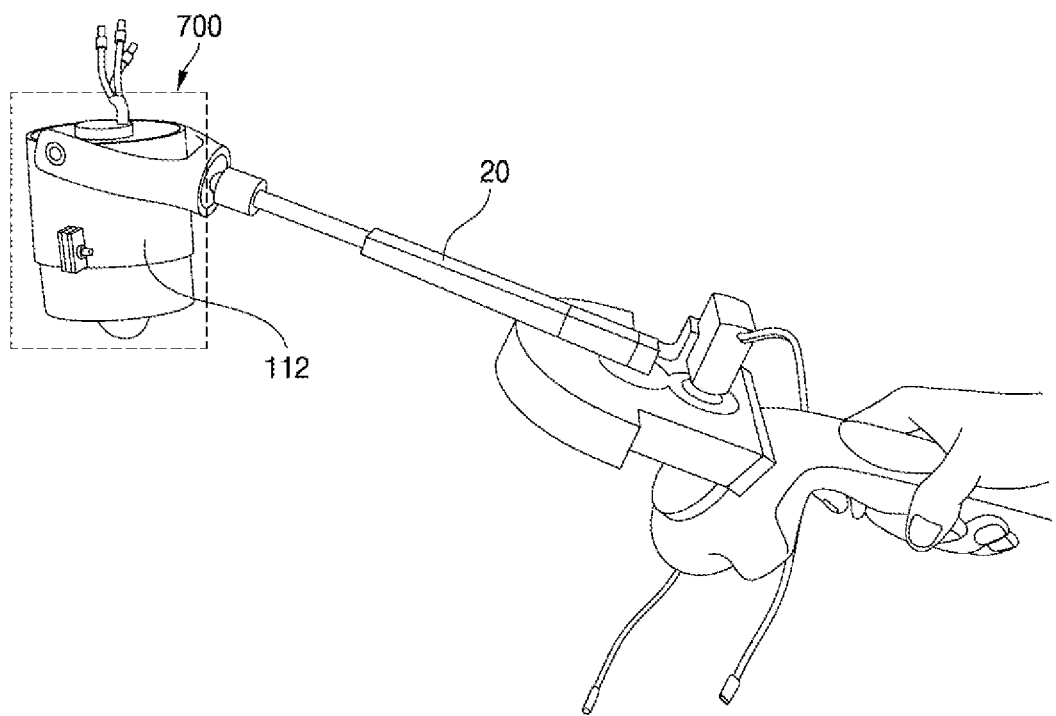

[Fig. 19A]
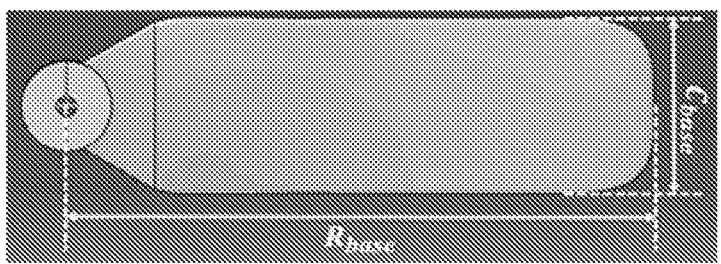
[Fig. 19B]
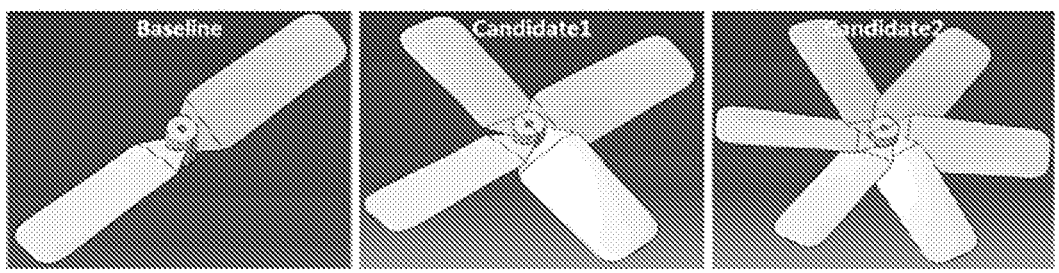

KINESTHETIC-FEEDBACK WEARABLE APPARATUS FOR VIRTUAL REALITY AND AUGMENTED REALITY AND METHOD FOR CONTROLLING THE SAME

BACKGROUND OF THE INVENTION

1. Field of the Invention

The present invention relates to a kinesthetic-feedback wearable apparatus which realizes a kinesthetic-feedback in a virtual reality (VR) or augmented reality (AR), and more particularly to a kinesthetic-feedback wearable apparatus which provides a resistance, which is suitable for a situation in a virtual reality or augmented reality, to a user by using a propeller in a state in which a virtual reality or augmented reality device is mounted to the user who uses the virtual reality or augmented reality device.

2. Description of the Related Art

Main IT businesses have made investments on the VR/AR technologies, and are making many efforts to develop hardware and software platforms for producing and consuming VR/AR contents. The technologies of optics and computer graphics for realistic simulations have greatly developed, and there is still many difficulties in using haptic information that is the most important physical factor for recognizing a space.

Haptic information may be provided in the form of a tactile or kinesthetic feedback, and the tactile system is small-sized to be mounted, but there is a factor for giving a force so that it is impossible to reproduce a feeling of touching an actual thing in a space. Meanwhile, the kinesthetic system may reproduce a factor of a force, but is not suitable for a mobile VR/AR system which realizes a free movement of the user in a virtual space because the kinesthetic system requires a large-sized system for an operation.

PRIOR TECHNICAL DOCUMENTS

Patent Documents (Patent Document 1) KR10-2017-0097539 A

SUMMARY OF THE INVENTION

The present invention has been made in an effort to solve the above-mentioned problems, and provides a kinesthetic-feedback wearable apparatus by which a reactive force for a kinesthetic-feedback can be easily realized through a scheme of attaching a light propeller to a wrist, and reactive forces of various directions may be realized only with a small number of propellers by allowing the directions and the RPMs of the propellers to be separately controlled for a higher degree of freedom when two or more propellers are provided.

In accordance with an aspect of the present invention, there is provided a kinesthetic-feedback wearable apparatus for a virtual reality or augmented reality, which is mounted on a user, including: a sensor unit including one or more sensors for detecting a posture or a motion of the user; a control unit configured to control rotation of a propeller in response to a control signal of a control computer; a driving unit configured to be operated by the control unit; a propeller configured to rotate according to driving of the driving unit; and a communication unit configured to receive the control signal of the control computer and transmit posture or motion information (hereinafter, referred to as 'posture information') on the user detected by the sensor unit to the control computer.

A direction of wind (hereinafter, referred to as 'direction of propeller wind') blown out from the propeller may be controllable in response to the control signal of the control computer.

The control of the direction of the propeller wind may be made by adjusting a direction (hereinafter, referred to as 'propeller direction') which the propeller faces or changing a direction (hereinafter, referred to as 'direction of propeller rotation') of rotation of the propeller.

When the adjustment of the propeller direction is allowed, the driving unit further may include a propeller direction adjustment driving unit configured to change the propeller direction in response to the control signal of the control computer.

When two or more propellers are provided, the propeller direction or the direction of propeller rotation may be independently controllable.

An RPM of the propeller may be controllable in response to the control signal of the control computer.

When two or more propellers are provided, the RPMs of the propellers may be independently controllable.

The kinesthetic-feedback wearable apparatus may further include a cylindrical duct, opposite bottom surfaces of which are opened, and the propeller may be installed in a support member in the interior of the duct.

In accordance with another aspect of the present invention, there is provided method for controlling an operation of a kinesthetic-feedback wearable apparatus (hereinafter referred to as 'kinesthetic-feedback wearable apparatus' for a virtual reality or augmented reality (hereinafter, referred to as 'VR/AR'), which is mounted to a user, the method including: (a) receiving in real time posture information on the user, which is detected by a sensor of the kinesthetic-feedback wearable apparatus; (b) receiving current situation information in a game using the VR/AR, from an application which provides the game to the user while being operated in a computer; and (c) transmitting a control signal for driving a propeller of the kinesthetic-feedback wearable apparatus to the kinesthetic-feedback wearable apparatus according to the situation information and the posture information.

The control signal may further include a signal for controlling a direction (hereinafter, referred to as 'direction of propeller wind') of wind blown out from the propeller.

The control of the direction of the propeller wind may be made by adjusting a direction (hereinafter, referred to as 'propeller direction') which the propeller faces or changing a direction (hereinafter, referred to as 'direction of propeller rotation') of rotation of the propeller.

When two or more propellers are provided in the kinesthetic-feedback wearable apparatus, the propeller direction or the direction of propeller rotation may be independently controllable for the propellers.

The control signal further may include a signal for controlling an RPM of the propeller.

When two or more propellers are provided in the kinesthetic-feedback wearable apparatus, the RPMs of the propellers may be independently controllable for the propellers.

In accordance with another aspect of the present invention, there is provided an electronic device including: at least one processor, and a memory configured to store a command, which is executable by a computer, wherein the command executable by the computer, which is stored in the memory, is configured to execute, by the at least one processor, operations of: (a) receiving in real time posture information on the user, which is detected by a sensor of the kinesthetic-feedback wearable apparatus; (b) receiving current situation information in a game using the VR/AR, from an application which provides the game to the user while being operated in a computer; and (c) transmitting a control signal for driving a propeller of the kinesthetic-feedback wearable apparatus to the kinesthetic-feedback wearable apparatus according to the situation information and the posture information.

In accordance with another aspect of the present invention, there is provided an apparatus which is attachable to and detachable from a kinesthetic-feedback wearable apparatus and is configured to realize a virtual reality or augmented reality when being attached to the kinesthetic-feedback wearable apparatus, the apparatus including: a kinesthetic-feedback wearable apparatus interface unit connected to and mounted on an interface unit of the kinesthetic-feedback wearable apparatus and configured to receive posture or motion information (hereinafter, referred to as 'posture information') on a user, which is detected by a sensor of the kinesthetic-feedback wearable apparatus; a control unit configured to control rotation of a propeller in response to a control signal of a control computer; a driving unit configured to be operated by the control unit; a propeller configured to rotate according to driving of the driving unit; and a communication unit configured to receive the control signal of the control computer and transmit, to the control computer, the posture information received through the kinesthetic-feedback wearable apparatus interface.

BRIEF DESCRIPTION OF THE DRAWINGS

Hereinafter, exemplary embodiments of the present invention for achieving the effects will be described in detail with reference to the accompanying drawings.

FIG. 1 is a view illustrating a situation as an embodiment in which a kinesthetic-feedback wearable apparatus is used in a VR/AR according to the present invention;

FIG. 2 is a view illustrating a configuration and a form as an embodiment of the kinesthetic-feedback wearable apparatus in a VR/AR according to the present invention;

FIG. 3 is a view illustrating that a duct of the kinesthetic-feedback wearable apparatus in a VR/AR may rotate by 360 degrees according to the present invention;

FIG. 4 is a view illustrating the configuration of the kinesthetic-feedback wearable apparatus in a VR/AR according to the present invention with a block diagram;

FIG. 5 is a view illustrating a configuration of an electronic device connected to the kinesthetic-feedback wearable apparatus in a VR/AR according to the present invention;

FIG. 6 is a flowchart illustrating a method for controlling the kinesthetic-feedback wearable apparatus in a VR/AR according to the present invention;

FIG. 7A and FIG. 7B are views illustrating a situation in which a kinesthetic-feedback of the kinesthetic-feedback wearable apparatus according to the present invention is operated in a VR/AR which realizes wielding of a sword;

FIG. 8A and FIG. 8B are views illustrating a situation in which a kinesthetic-feedback of the kinesthetic-feedback wearable apparatus according to the present invention is operated in a VR/AR which realizes shooting of a gun;

FIG. 9A and FIG. 9B are views illustrating a situation in which a kinesthetic-feedback of the kinesthetic-feedback wearable apparatus according to the present invention is operated in a VR/AR which realizes protecting of a shield;

FIG. 10 is a view illustrating a situation in which a kinesthetic-feedback of the kinesthetic-feedback wearable apparatus according to the present invention is operated in a VR/AR which realizes pushing of a wall;

FIG. 11 is a view illustrating a situation in which a kinesthetic-feedback of the kinesthetic-feedback wearable apparatus according to the present invention is operated in a VR/AR which realizes touching of a ball;

FIG. 12 is a view illustrating a situation in which a kinesthetic-feedback of the kinesthetic-feedback wearable apparatus according to the present invention is operated in a VR/AR which realizes striking of a shuttlecock;

FIG. 13A and FIG. 13B are views illustrating a situation in which a kinesthetic-feedback of the kinesthetic-feedback wearable apparatus according to the present invention is operated in a VR/AR which realizes twisting of an arm by another person;

FIG. 14 is a view illustrating an embodiment in which the kinesthetic-feedback wearable apparatus according to the present invention is mounted on a helmet;

FIG. 15 is a view illustrating an embodiment in which the kinesthetic-feedback wearable apparatus according to the present invention is mounted on an ankle;

FIG. 16 is a view illustrating an embodiment in which the kinesthetic-feedback wearable apparatus according to the present invention is mounted on a knuckle;

FIG. 17 is a view illustrating an embodiment in which the kinesthetic-feedback wearable apparatus according to the present invention is mounted on a head-mounted display (HMD);

FIG. 18 is a view illustrating an embodiment in which the kinesthetic-feedback wearable apparatus according to the present invention is mounted on a controller; and FIG. 19A and FIG. 19B are views illustrating a shape of a propeller of the kinesthetic-feedback wearable apparatus according to the present invention.

DETAILED DESCRIPTION OF THE INVENTION

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

FIG. 1 is a view illustrating a situation as an embodiment in which a kinesthetic-feedback wearable apparatus is used in a VR/AR according to the present invention.

The kinesthetic-feedback wearable apparatus 100 is mounted on a user, and functions to detect a posture or a motion of the user and provides a feedback such that a reactive force according to an action of the user on a virtual reality (VR) or augmented reality (AR) is felt by the user.

Although not illustrated, an electronic device 200 (see FIGS. 4 and 5) connected to a head-mounted display (HMD)

10 and the kinesthetic-feedback wearable apparatus 100 is provided. The electronic device 200 may include a mobile device such as a smartphone, a tablet device, a notebook, and another type of mobile device such as a head-up display (HUD), or a holding type computer device such as a desktop computer. The electronic device 200 performs an application (a VR/AR application 400 (see FIG. 5)) such as a game using a VR/AR, and the performed application 400 is displayed on the HMD 10 worn by the user.

The controller 20 detects a location of a hand of the user and delivers the detected location to the VR/AR application 400 performed on the electronic device 200, and the VR/AR application 400 delivers information on a current situation during execution of the application to a kinesthetic-feedback wearable apparatus driver 300 (see FIG. 5) executed by the electronic device 200. The kinesthetic-feedback wearable apparatus driver 300 sends a control signal to the kinesthetic-feedback wearable apparatus 100 according to the situation information, and allows the user to feel the kinesthetic-feedback by driving a propeller in a suitable direction.

Hereafter, a configuration of the kinesthetic-feedback wearable apparatus 100 will be described in detail with reference to FIGS. 2 to 4.

FIG. 2 is a view illustrating a configuration and a form as an embodiment of the kinesthetic-feedback wearable apparatus 100 in a VR/AR according to the present invention. FIG. 3 is a view illustrating that a duct of the kinesthetic-feedback wearable apparatus in a VR/AR may rotate by 360 degrees according to the present invention. FIG. 4 is a view illustrating the configuration of the kinesthetic-feedback wearable apparatus 100 in a VR/AR according to the present invention with a block diagram.

Hereafter, a configuration of the kinesthetic-feedback wearable apparatus 100 will be described with reference to FIGS. 2 and 4.

A propeller unit 110 includes a propeller which is driven and rotated in response to a control signal sent by the kinesthetic-feedback wearable apparatus driver 300 executed by the electronic device 200. In the following description with reference to FIGS. 2 and 4, the electronic device 200 will be referred to as 'a control computer 200' which means a device, by which the kinesthetic-feedback wearable apparatus driver 300 is executed.

The propeller 111 may be provided in the interior of a cylindrical duct 112, opposite bottom surfaces of which are opened. That is, the propeller 111 is installed in a support member 113 in the interior of the duct 112, and provides a reactive force to the user through rotation thereof. The duct 112 shows an effect of concentrating wind power through rotation of the propeller 110 further on a specific direction.

The control unit 120 controls rotation of the propeller in response to a control signal of the control computer. That is, the control signal may include a signal for rotating the propeller 111, and in response to the control signal, the control unit 120 rotates the propeller by operating the driving unit 130. The driving unit 130 may include a propeller rotation driving unit 131 for rotating the propeller. The propeller rotation driving unit 131 may be a motor, and the propeller 111 is rotated by an operation of the propeller rotation driving unit 131.

A RPM of the propeller 111 may be controlled in response to a control signal of the kinesthetic-feedback wearable apparatus driver 300 executed by the control computer 200. That is, as the RPM of the propeller 111 varies according to a situation, a reactive force felt by the user may vary.

Further, a direction (hereinafter, referred to as 'propeller direction'), which the propeller 111 faces, may vary. That is, referring to FIG. 3, the propeller direction may be adjusted to an arrow direction 1 through an operation of a propeller direction change driving unit 132 equipped with a motor and the like. Although the propeller direction may be adjusted by rotating the support member connected to the center of the propeller 111 to the arrow direction 1 when there is not any duct 112, a direction (hereinafter, referred to as 'direction of propeller wind') of wind blown out from the propeller 111 may be adjusted by directly rotating the duct 112 with the propeller direction change driving unit 132 and thus changing the propeller direction when there is a duct 112 as in FIG. 3. It is preferable that the propeller direction may be rotated by 360 degrees.

Further, as another method for adjusting the direction of propeller wind, a scheme of reversing the rotational direction of the propeller 111 while the duct 112 remains not rotated may be employed. That is, the direction of propeller wind is not adjusted by rotating the duct 112 to the arrow direction 1, but the direction of propeller wind is reversely adjusted by reversing the rotation of the propeller 111 in a state in which the duct 112 remains unchanged. This may be performed by rotating the propeller 111 in a reverse direction by the propeller rotation driving unit 131. However, although the scheme may be quicker when the direction of propeller wind is reversed, that is, is changed by 180 degrees, the scheme of rotating the duct 112 may adjust the direction of propeller wind in all directions as the duct 112 may rotate by 360 degrees.

If a scheme of controlling the direction of propeller wind to a reverse direction by changing the direction of rotation of the propeller while not rotating the duct 112 is employed, the location of the propeller 111 in the duct 112 is preferably located at around an intermediate portion of the interior of the duct 112. It is because even though the wind proceeds in any direction, the wind may be ejected after passing through the interior of the cylinder of the duct 12 and being concentrated.

The adjustment of the propeller direction or the adjustment of the direction of rotation of the propeller, for the adjustment of the direction of propeller wind, may be also controlled in response to a control signal from the kinesthetic-feedback wearable apparatus driver 300 of the control computer 200.

One propeller unit 110 of the kinesthetic-feedback wearable apparatus 100 may be provided, but a plurality of, such as two or more, propeller units 110 may be provided. FIG. 2 illustrates an embodiment in which two propeller units 110 are provided. FIG. 2 illustrates a state in which the duct 112 of the left propeller unit 110 is rotated to be perpendicular to the duct 112 of the right propeller unit 110. That is, the left shape shows a lateral surface of the cylindrical duct 112.

When the kinesthetic-feedback wearable apparatus 100 includes two or more propeller units 110, the propeller unit 110 may be preferably independently controlled.

That is, the directions of propeller wind of the propellers 111 also may be independently controlled, and the RPMs of the propellers also may be independently controlled. Through the independent controls, the degrees of freedom may become high even with a small number of propellers and various reactive kinesthetic-feedbacks may be provided to the user. In this way, the independent controls of the propeller units 110 also may be made with a control signal form the kinesthetic-feedback wearable apparatus driver 300.

A sensor unit 140 includes one or more sensors for detecting a posture or a motion of the user. That is, for example, the sensor unit 140 may include a gyro sensor for detecting an acceleration and an inclination, a geomagnetic sensor for detecting horizontality, and the like. The sensor unit detects a posture and a motion of the user and transmits information (hereinafter, generally referred to as 'posture information') such as the posture and the motion to the kinesthetic-feedback wearable apparatus driver 300 executed by the control computer 200 such that the kinesthetic-feedback wearable apparatus driver 300 may properly control the propeller directions and the RPMs of the propellers 111.

A communication unit 150 receives the control signal from the control computer 200, and transmits the posture information on the user detected by the sensor unit 140 to the control computer 200.

FIG. 5 is a view illustrating a configuration of an electronic device connected to the kinesthetic-feedback wearable apparatus in a VR/AR according to the present invention. FIG. 6 is a flowchart illustrating a method for controlling the kinesthetic-feedback wearable apparatus in a VR/AR according to the present invention.

As described above, the electronic device 200 may be a mobile device, such as a smartphone. However, the present invention is not limited thereto, but he electronic device 200 may include a tablet device, a notebook, and another type of mobile device such as a head-up display (HUD), or a holding type computer device such as a desktop computer.

The electronic device 200 includes a processor 210, a nonvolatile storage 220 configured to store programs and data, a volatile memory 230 configured to store programs that are being executed, a communication unit 240 for performing communication with another device, and a bus that is an interval communication passage between the devices. The programs that is being executed may include a device driver, an operating system, and various applications. FIG. 5 illustrates only one of the applications 400, such as a VR/AR game, for convenience. The device driver includes the kinesthetic-feedback wearable apparatus driver 300 according to the present invention. Although not illustrated, the electronic device includes an electric power providing unit, such as a battery.

The kinesthetic-feedback wearable apparatus driver 300 performs a control method including the following steps. That is, if the user executes the VR/AR application 400 and the kinesthetic-feedback wearable apparatus driver 300 in the electronic device 200 (S601), the kinesthetic-feedback wearable apparatus driver 300 receives in real time the posture information of the user detected by the kinesthetic-feedback wearable apparatus 100 (S602). In addition, the kinesthetic-feedback wearable apparatus driver 300 receives current situation information in the game from the VR/AR application 400 (S603).

The kinesthetic-feedback wearable apparatus driver 300 transmits, to the kinesthetic-feedback wearable apparatus 100, a control signal for driving the propeller 111 of the kinesthetic-feedback wearable apparatus 100 according to the situation information and the posture information received (S604 and S605).

As described above with reference to FIGS. 2 to 4, the control signal may include a signal for controlling the direction of propeller wind, a driving signal of the propeller, and a signal for controlling an RPM of the propeller. In this case, when the propeller is installed in the support member 113 in the interior of the cylindrical duct, the control of the direction of propeller wind may be made in a method of adjusting the propeller direction by controlling the direction of the duct 112. It is preferable that the propeller direction may be rotated by 360 degrees.

Further, as described above with reference to FIG. 2, as another method for adjusting the direction of propeller wind, a scheme of reversing the rotational direction of the propeller 111 while the duct 112 remains not rotated may be employed. That is, the direction of propeller wind is not adjusted by rotating the duct 112 to the arrow direction 1, but the direction of propeller wind is reversely adjusted by reversing the rotation of the propeller 111 in a state in which the duct 112 remains unchanged. However, although the scheme may be quicker when the direction of propeller wind is reversed, that is, is changed by 180 degrees, the scheme of rotating the duct 112 may adjust the direction of propeller wind in all directions as the duct 112 may rotate by 360 degrees.

In addition, as described above with reference to FIGS. 2 to 4, when the kinesthetic-feedback wearable apparatus 100 includes two or more propellers, the directions of propeller wind, the driving and the RPMs of the propellers may be independently controlled.

In this way, the operation of transmitting the control signal may be performed in the following way. That is, if the current situation information in the game is received from the VR/AR application 400 (S603), the kinesthetic-feedback wearable apparatus driver 300 determines the kind of the situation from the received situation information and executes a control of the kinesthetic-feedback wearable apparatus 100 according to control parameters that is preset for the kind of situation (S604), and in this case, a control is executed by adjusting control parameters, such as the directions of propeller wind, the propeller directions, and the RPMs of the kinesthetic-feedback wearable apparatus 100 according to the posture information (S602) of the user, which is received in real time from the kinesthetic-feedback wearable apparatus 100 (S605).

The operation of transmitting the control signal will be described through the embodiment of FIG. 7A and FIG. 7B.

FIG. 7A and FIG. 7B are views illustrating a situation in which a kinesthetic-feedback of the kinesthetic-feedback wearable apparatus 100 according to the present invention is operated in a VR/AR which realizes wielding of a sword.

FIG. 7A illustrates an action of the user, and FIG. 7B illustrates a VR/AR situation displayed on the HMD 10 of the user. If the current situation information in the game is received from the VR/AR application 400 (S603), the kinesthetic-feedback wearable apparatus driver 300 determines the kind of situation from the received situation information. That is, in FIG. 7A and FIG. 7B, situation information telling "wielding a sword (the controller 20); gripping the sword 501 on the HMD in advance") is received from the VR/AR application 400, the kinesthetic-feedback wearable apparatus driver 300 executes the control of the kinesthetic-feedback wearable apparatus 100 according to the parameter values that are preset for the 'sword' (S604). For example, a control is executed according to the preset control parameters such that a starting point corresponds to a maximum speed and the intensity of the wind decreases toward an ending point in the wielding of the sword. The control of the propeller is executed by adjusting the control parameters, such as the propeller direction and the RPM of the kinesthetic-feedback wearable apparatus 100 according to the posture information (S602) of the user, which is received in real time from the kinesthetic-feedback wearable apparatus 100, that is, the location and the angle of a hand according to the posture (S605).

FIG. 8A and FIG. 8B are views illustrating a situation in which a kinesthetic-feedback of the kinesthetic-feedback wearable apparatus 100 according to the present invention is operated in a VR/AR which realizes shooting of a gun. FIG. 9A and FIG. 9B are views illustrating a situation in which a kinesthetic-feedback of the kinesthetic-feedback wearable apparatus is operated in a VR/AR which realizes protecting of a shield.

FIG. 8A,9A also illustrate an action of the user and FIG. 8B,9B also illustrate a VR/AR situation displayed on the HMD 10 of the user. In FIG. 8A and FIG. 8B, When the user pulls a trigger of the controller 20, a bullet or a laser is fired from a gun 502 on the VR/AR, a signal telling that the trigger is pulled may be directly transmitted from the controller 20 to the kinesthetic-feedback wearable apparatus driver 300, or the VR/AR application 400 may send the situation information including information on the pulling of the trigger to the kinesthetic-feedback wearable apparatus driver 300 after the signal telling that the trigger is pulled is transmitted from the controller 20 to the VR/AR application 400. The kinesthetic-feedback wearable apparatus driver 300 that recognized the pulling of the trigger operates the propeller of the kinesthetic-feedback wearable apparatus 100.

FIG. 9A and FIG. 9B may execute a control signal transmitting process that is similar to the wielding of the sword of FIG. 7A and FIG. 7B when the shield is moved according to an attack of an attacker. That is, when situation information telling "moving a shield (the controller 20); gripping the shield 503 on the HMD in advance" is received from the VR/AR application 400, the kinesthetic-feedback wearable apparatus driver 300 executes the control of the kinesthetic-feedback wearable apparatus 100 according to the parameter values that are preset for the 'sword' (S604). In this case, the control of the propeller is executed (S605) by adjusting the control parameters, such as the propeller direction and the RPM of the kinesthetic-feedback wearable apparatus 100 according to the posture information (S602) of the user, which is received in real time from the kinesthetic-feedback wearable apparatus 100, that is, the location and the angle of a hand according to the posture. Further, situation information telling collision (504) of the weapon of the attacker and the shield 503 is received from the VR/AR application 400, the kinesthetic-feedback wearable apparatus driver 300 adjusts the control parameters such as the RPM of the propeller for a reactive force according to the collision 504 and transmits an RPM control signal of the propeller 111 to the kinesthetic-feedback wearable apparatus 100 (S605).

FIG. 10 is a view illustrating a situation in which a kinesthetic-feedback of the kinesthetic-feedback wearable apparatus according to the present invention is operated in a VR/AR which realizes pushing of a wall.

In order to realize a force received from a wall 505 of the VR/AR, as illustrated, a direction of the propeller is adjusted. The direction of propeller wind may be realized in a scheme of changing the rotational direction of the propeller, but the direction of the wind may be changed by rotating the duct 112.

FIG. 11 is a view illustrating a situation in which a kinesthetic-feedback of the kinesthetic-feedback wearable apparatus according to the present invention is operated in a VR/AR which realizes touching of a ball.

For touching of a ball, a control signal transmitting process that is similar to that of the 'shield' operation of FIG. 9A and FIG. 9B is performed. That is, processes of transmitting control signals telling that a hand moves and the ball 506 collides with a hand at any point during the motion of the hand are similar. Of course, control parameters such as an intensity of collision may be differently set, and the control signal for the RPM may be transmitted as another value.

FIG. 12 is a view illustrating a situation in which a kinesthetic-feedback of the kinesthetic-feedback wearable apparatus according to the present invention is operated in a VR/AR which realizes striking of a shuttlecock.

For striking of a shuttlecock, a control signal transmitting process that is similar to those of the 'shield' operation of FIG. 9A and FIG. 9B and the touching of a ball of FIG. 11. That is, processes of transmitting control signals telling that a ball moves and the shuttlecock 507 collides with a racket at any point during the motion of the hand are similar. Of course, control parameters such as an intensity of collision may be differently set, and the control signal for the RPM may be transmitted as another value.

FIG. 13A and FIG. 13B are views illustrating a situation in which a kinesthetic-feedback of the kinesthetic-feedback wearable apparatus according to the present invention is operated in a VR/AR which realizes twisting of an arm by another person.

If an arm 508 of another person twists an arm of the user on the VR/AR in FIG. 13A, the opposite sides of the hand of the user receives a force in an opposite direction. Accordingly, situation information telling "twisting of a hand; being twisted (509) by an attacker 508 in advance" is received from the VR/AR application 400, the kinesthetic-feedback wearable apparatus driver 300 executes the control of the kinesthetic-feedback wearable apparatus 100 according to the parameter values that are preset for the 'twisting of the hand' (S604). The received situation information may include twisting direction information (509), and accordingly, in the control parameter, the wind directions of both the propellers are set to be opposite as in FIG. 13B, and according to the parameter, the kinesthetic-feedback wearable apparatus driver 300 sends a control signal to the kinesthetic-feedback wearable apparatus 100.

FIG. 13B illustrates a case in which the directions of both the ducts 112 are controlled to opposite directions and the propeller direction of the propeller is changed such that the direction of the wind of the propeller faces in an opposite direction, but as illustrated with reference to FIG. 2, the direction of propeller wind may be made to face an opposite direction by adjusting the rotational direction of the propeller to an opposite direction while the duct 112 maintains its state. Although the scheme may be quicker when the direction of propeller wind is reversed, that is, is changed by 180 degrees, the scheme of rotating the duct 112 and allowing the propeller direction to rotate by 360 degrees may adjust the direction of propeller wind in all directions.

FIGS. 14 to 16 are views illustrating embodiments of various mounting states of the kinesthetic-feedback wearable apparatus 100 according to the present invention.

That is, FIG. 14 is a view illustrating an embodiment in which the kinesthetic-feedback wearable apparatus 100 is attached to a helmet 2. FIG. 15 is a view illustrating an embodiment in which the kinesthetic-feedback wearable apparatus 100 according to the present invention is mounted on an ankle. FIG. 16 is a view illustrating an embodiment in which the kinesthetic-feedback wearable apparatus according to the present invention is mounted on a knuckle, which is fitted with a finger.

FIG. 17 is a view illustrating an embodiment in which the kinesthetic-feedback wearable apparatus 100 according to the present invention is mounted on a head-mounted display (HMD) 10. FIG. 18 is a view illustrating an embodiment in which the kinesthetic-feedback wearable apparatus 100 according to the present invention is mounted on the controller 20.

The kinesthetic-feedback wearable apparatus 100 described with reference to FIGS. 1 to 13 is mounted to a wrist to provide kinesthetic-feedback through driving of the propeller to the user. In addition, as illustrated in FIG. 14, the kinesthetic-feedback wearable apparatus 100 may be attached to the helmet 2, as illustrated in FIG. 15, the kinesthetic-feedback wearable apparatus 100 may be mounted on an ankle, and as illustrated in FIG. 16, the kinesthetic-feedback wearable apparatus 100 may be attached to a knuckle fitted with a finger.

In addition, the kinesthetic-feedback wearable apparatus according to the present invention may be configured as a module to be attached to another portion if necessary. That is, the kinesthetic-feedback wearable apparatuses may be attached to or detached from various portions of the human body and the kinesthetic-feedback wearable apparatus according to the present invention may be attached to or detached from such kinesthetic-feedback wearable apparatuses so that the kinesthetic-feedback wearable apparatus may be mounted to the kinesthetic-feedback wearable apparatus mounted on another portion if necessary. The kinesthetic-feedback wearable apparatus according to the present invention, which is configured as a module to be attached to the kinesthetic-feedback wearable apparatus mounted on the human body will be referred to as 'kinesthetic-feedback apparatus' to be distinguished from the mounted kinesthetic-feedback wearable apparatuses for convenience.

In this case, the kinesthetic-feedback wearable apparatuses attached to various portions of the human body are provided with sensors capable of detecting motions of the portions, and are provided with interface units, on which the kinesthetic-feedback apparatus according to the present invention may be mounted.

The kinesthetic-feedback apparatus includes a kinesthetic-feedback wearable apparatus interface unit connected to and mounted on an interface unit of the kinesthetic-feedback wearable apparatus and configured to receive posture or motion information (hereinafter, referred to as 'posture information') on a user, which is detected by a sensor of the kinesthetic-feedback wearable apparatus.

That is, the interface units of the kinesthetic-feedback wearable apparatuses and the interface unit of the kinesthetic-feedback apparatus may be physically attached to or detached from each other, and function to transmit the sensor signals of the kinesthetic-feedback wearable apparatuses to the kinesthetic-feedback apparatus. The interface unit includes a plurality of interfaces, and may deliver various sensor signals.

Further, the kinesthetic-feedback apparatus includes the configurations of the kinesthetic-feedback wearable apparatus 100 described with reference to FIGS. 1 to 16, except for the sensor unit. That is, kinesthetic-feedback apparatus includes a control unit configured to control rotation of the propeller in response to a control signal of the control computer, a driving unit operated by the control unit, a propeller rotated according to driving of the driving unit, and a communication unit configured to receive the control signal of the control computer and transmit the posture information received through the kinesthetic-feedback wearable apparatus interface unit to the control computer. That is, the kinesthetic-feedback apparatus according to the present invention is configured as a module as described above, and may be mounted on a necessary portion of the kinesthetic-feedback wearable apparatuses mounted on portions of the human body to be used conveniently.

For example, in FIG. 14, the helmet 2 becomes the kinesthetic-feedback wearable apparatus, the helmet includes a sensor and an interface unit, and the kinesthetic-feedback apparatus (indicated by 100 in FIG. 14) according to the present invention is mounted on the helmet. Similarly, in FIG. 15, the kinesthetic-feedback wearable apparatus is mounted on a portion of an ankle in the form of a band, and the kinesthetic-feedback apparatus (indicated by 100 in FIG. 15) according to the present invention is mounted to the interface unit.

Further, in FIG. 17, the HMD 10 includes an interface unit and the kinesthetic-feedback wearable apparatus 700 is mounted on the HMD 10, and in FIG. 18, the controller 20 includes an interface unit and the kinesthetic-feedback apparatus 700 according to the present invention is mounted on the controller 20. Of course, as described above, the same kinesthetic-feedback apparatus 700 as a module may be mounted to necessary sites, such as the HMD 10, the controller 20, the helmet 2, the kinesthetic-feedback wearable apparatus mounted on an ankle, and the kinesthetic-feedback wearable apparatus mounted on a wrist.

FIG. 19A and FIG. 19B are views illustrating a shape of a propeller of the kinesthetic-feedback wearable apparatus according to the present invention.

FIG. 19A is a view illustrating a chord length and a radius in a blade of a propeller. A portion indicated by Cbase in the drawing is the chord length of the blade, and a portion indicated by Rbase in the drawing is the radius of the blade.

FIG. 19B is a view illustrating the shape of the propeller when the number of blades is two (baseline), four, and six. Accordingly, the design parameters, and the analyzed thrusts and powers for the shapes of the propellers are as follows.

TABLE 1

|  | Baseline | Candidate1 | Candidate2 |
| --- | --- | --- | --- |
| Number of blades | 2 | 4 | 6 |
| Ratio of radius | 1.0 | 0.9 (−10%) | 0.875 (−12.5%) |
| Ratio of chord length | 1.0 | 1.1 (10%) | 0.98 (−2%) |
| Thrust | 0.402N | 0.407N (1.34%) | 0.455N (13.12%) |
| Power | 5.273 W | 6.070 W (15.12%) | 7.259 W (36.67%) |

Here, the ratio of radii means the ratio of the blade radii of the models for the blade radius of the base line, and the ratio of chord lengths means the ratio of the chord lengths of the blades of the models for the chord length of the blade of the base line.

According to the present invention, a reactive force for a kinesthetic-feedback can be easily realized through a scheme of attaching a light propeller to a wrist, and reactive forces of various directions may be realized only with a small number of propellers by allowing the directions and the RPMs of the propellers to be separately controlled for a higher degree of freedom when two or more propellers are provided.

What is claimed is:

1. A kinesthetic-feedback wearable apparatus for a virtual reality or augmented reality, which is mounted on a user, comprising:
   a sensor unit including one or more sensors for detecting a posture or a motion of the user;

a control unit configured to control rotation of a propeller in response to a control signal of a control computer;
a driving unit configured to be operated by the control unit;
a propeller configured to rotate according to driving of the driving unit; and
a communication unit configured to receive the control signal of the control computer and transmit posture or motion information on the user detected by the sensor unit to the control computer.

2. The virtual reality or an augmented reality of claim 1, wherein a direction of wind blown out from the propeller is controllable in response to the control signal of the control computer.

3. The kinesthetic-feedback wearable apparatus of claim 2, wherein the control of the direction of the propeller wind is made by adjusting a direction which the propeller faces or changing a direction of rotation of the propeller.

4. The kinesthetic-feedback wearable apparatus of claim 3, wherein when the adjustment of the direction which the propeller faces is allowed, the driving unit further includes a propeller direction adjustment driving unit configured to change the direction which the propeller faces in response to the control signal of the control computer.

5. The kinesthetic-feedback wearable apparatus of claim 3, wherein when two or more propellers are provided, the direction which the propeller faces or the direction of rotation of the propeller is independently controllable.

6. The kinesthetic-feedback wearable apparatus of claim 1, wherein an RPM of the propeller is controllable in response to the control signal of the control computer.

7. The kinesthetic-feedback wearable apparatus of claim 6, wherein when two or more propellers are provided, the RPMs of the propellers are independently controllable.

8. The kinesthetic-feedback wearable apparatus of claim 1, further comprising:
a cylindrical duct, opposite bottom surfaces of which are opened,
wherein the propeller is installed in a support member in the interior of the duct.

9. A method for controlling an operation of a kinesthetic-feedback wearable apparatus for a virtual reality or augmented reality, which is mounted to a user, the method comprising:
(a) receiving in real time posture or motion information on the user, which is detected by a sensor of the kinesthetic-feedback wearable apparatus;
(b) receiving current situation information in a game using the virtual reality or augmented reality, from an application which provides the game to the user while being operated in a computer; and
(c) transmitting a control signal for driving a propeller of the kinesthetic-feedback wearable apparatus to the kinesthetic-feedback wearable apparatus according to the situation information and the posture or motion information.

10. The method of claim 9, wherein the control signal further includes a signal for controlling a direction of wind blown out from the propeller.

11. The method of claim 10, wherein the control of the direction of the propeller wind is made by adjusting a direction which the propeller faces or changing a direction of rotation of the propeller.

12. The method of claim 11, wherein when two or more propellers are provided in the kinesthetic-feedback wearable apparatus, the direction which the propeller faces or the direction of rotation of the propeller is independently controllable for the propellers.

13. The method of claim 9, wherein the control signal further includes a signal for controlling an RPM of the propeller.

14. The method of claim 13, wherein when two or more propellers are provided in the kinesthetic-feedback wearable apparatus, the RPMs of the propellers are independently controllable for the propellers.

15. An electronic device comprising:
at least one processor, and
a memory configured to store a command, which is executable by a computer,
wherein the command executable by the computer, which is stored in the memory, is configured to execute, by the at least one processor, operations of:
(a) receiving in real time posture or motion information on the user, which is detected by a sensor of the kinesthetic-feedback wearable apparatus;
(b) receiving current situation information in a game using the virtual reality or augmented reality, from an application which provides the game to the user while being operated in a computer; and
(c) transmitting a control signal for driving a propeller of the kinesthetic-feedback wearable apparatus to the kinesthetic-feedback wearable apparatus according to the situation information and the posture or motion information.

16. An apparatus which is attachable to and detachable from a kinesthetic-feedback wearable apparatus and is configured to realize a virtual reality or augmented reality when being attached to the kinesthetic-feedback wearable apparatus, the apparatus comprising:
a kinesthetic-feedback wearable apparatus interface unit connected to and mounted on an interface unit of the kinesthetic-feedback wearable apparatus and configured to receive posture or motion information on a user, which is detected by a sensor of the kinesthetic-feedback wearable apparatus;
a control unit configured to control rotation of a propeller in response to a control signal of a control computer;
a driving unit configured to be operated by the control unit;
a propeller configured to rotate according to driving of the driving unit; and
a communication unit configured to receive the control signal of the control computer and transmit, to the control computer, the posture or motion information received through the kinesthetic-feedback wearable apparatus interface.

* * * * *